United States Patent
Mansour et al.

(10) Patent No.: US 10,474,500 B2
(45) Date of Patent: Nov. 12, 2019

(54) RUNNING COMPLEX WORKFLOWS IN DISTRIBUTED SYSTEMS WHILE PROTECTING CONSISTENCY AND ENSURING PROGRESS DESPITE FAILURES

(71) Applicant: MICROSOFT TECHNOLOGY LICENSING, LLC, Redmond, WA (US)

(72) Inventors: Peter Mansour, Bothell, WA (US); Rafayel Bezirganyan, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 75 days.

(21) Appl. No.: 15/818,180

(22) Filed: Nov. 20, 2017

(65) Prior Publication Data

US 2019/0155649 A1    May 23, 2019

(51) Int. Cl.
| | | |
|---|---|---|
| *G06F 9/50* | (2006.01) | |
| *G06F 21/64* | (2013.01) | |
| *G06F 11/07* | (2006.01) | |
| *G06F 21/33* | (2013.01) | |
| *G06Q 10/06* | (2012.01) | |
| *H04L 9/32* | (2006.01) | |
| *H04L 29/06* | (2006.01) | |
| *H04L 9/08* | (2006.01) | |

(52) U.S. Cl.
CPC ............... *G06F 9/50* (2013.01); *G06F 21/64* (2013.01)

(58) Field of Classification Search
None
See application file for complete search history.

(56) References Cited

U.S. PATENT DOCUMENTS

| | | | |
|---|---|---|---|
| 6,052,684 A | 4/2000 | Du | |
| 2005/0256826 A1* | 11/2005 | Hambrick | ............... G06F 9/485 |
| 2011/0029498 A1* | 2/2011 | Ferguson | ............ G06F 16/2343 |
| | | | 707/703 |
| 2012/0131591 A1* | 5/2012 | Moorthi | ................. G06Q 10/06 |
| | | | 718/104 |
| 2014/0279987 A1 | 9/2014 | Chico de Guzman Huerta et al. | |

(Continued)

OTHER PUBLICATIONS

"Manage your apps instead of infrastructure", Retrieved From <<https://azure.microsoft.com/en-us/services/functions/>>, Retrieved on: Oct. 23, 2017, 9 Pages.

(Continued)

*Primary Examiner* — Wynuel S Aquino
(74) *Attorney, Agent, or Firm* — Workman Nydegger

(57) ABSTRACT

Complex workflows are composed of a plurality of idempotent actions. During execution of the complex workflows, a computing system accesses the plurality of idempotent actions and determines whether corresponding guard conditions for triggering processing of the idempotent action are satisfied. When satisfied, a lock is taken on one or more resources used for executing the idempotent code of the idempotent action and execution of the idempotent code is initiated. Thereafter, upon successful execution of the idempotent code, the corresponding record is updated to reflect execution of the idempotent action and the lock is released. When execution of the idempotent action is unsuccessful, an exception is logged and the lock is released.

20 Claims, 8 Drawing Sheets

(56) References Cited

U.S. PATENT DOCUMENTS

| | | | | |
|---|---|---|---|---|
| 2014/0282574 A1* | 9/2014 | Marathe | ............... | G06F 9/4881 |
| | | | | 718/103 |
| 2016/0147569 A1* | 5/2016 | Cowling | ................ | G06F 16/22 |
| | | | | 718/104 |
| 2017/0142035 A1* | 5/2017 | Bradley | ................. | H04L 51/32 |
| 2018/0143852 A1* | 5/2018 | Ballantyne | ............ | G06F 9/5027 |

OTHER PUBLICATIONS

Hogg, Jason, "Managing Concurrency in Microsoft Azure Storage", Retrieved From <<https://azure.microsoft.com/en-us/blog/managing-concurrency-in-microsoft-azure-storage-2/>>, Sep. 8, 2014, 10 Pages.

"International Search Report and Written Opinion Issued in PCT Application No. PCT/US18/060576", dated Feb. 27, 2019, 14 Pages.

Poola, et al., "A Taxonomy and Survey of Fault-Tolerant Workflow Management Systems in Cloud and Distributed Computing Environments", In Proceeding of Software Architecture for Big Data and the Cloud, Aug. 7, 2016, 30 Pages.

* cited by examiner

400

410

Identifying A Workflow Comprised Of A Plurality Of Idempotent Actions, Each Idempotent Action Comprising An Action Name, A Corresponding Guard That Specifies One Or More Guard Conditions For Triggering Execution Of The Idempotent Action, Idempotent Code That Is Atomically Executable In The Workflow, And A Record Reflecting A State Of Execution

420

Initiate Execution Of The Workflow, The Execution Of The Workflow Comprising Independent And Periodically Iterative Execution Of Each Idempotent Action In The Workflow Until The Workflow Is Completed

| Action | Guard | Core Logic |
|---|---|---|
| Generate New 810 | This is the first run. 812 OR This last certificate in the "New" slot was deleted. AND The last website deployment was at least one week ago. | Generate a new self-signed certificate on Key Vault in the "New" slot 814 |
| Whitelist New 820 | A new certificate was generated. 822 | Send a request to AAD to whitelist the certificate in the "New" slot, signed with the certificate in the "Main" slot. 824 |
| Backup Old 830 | This is the first run. 832 OR The last certificate in the "Old" Slot was deleted. | Copy the certificate in the "Main" slot to the "Old" slot in Key Vault. 834 |
| Upgrade New 840 | The certificate in the "Main" slot was backed up. 842 AND The certificate in the "New" slot was whitelisted. | Copy the certificate in the "New" slot to the "Main" slot in Key Vault. 844 |
| Delete New 850 | The certificate in the "New" slot was just upgraded. 852 | Delete the certificate in the "New" slot. 854 |
| Deploy Website 860 | The certificate in the "New" slot was just upgraded. 862 | Deploy the Azure Website, including the certificate in the "Main" slot from Key Vault. 864 |
| Un-whitelist Old 870 | The website was just deployed 872 AND It's been at least one hour since then. | Send a request to AAD to un-whitelist the certificate in the "Old" slot, signed with the certificate in the "Main" slot. 874 |
| Delete Old 880 | The certificate in the "Old" slot was just un-whitelisted. 882 | Delete the certificate in the "Old" slot from Key Vault. 884 |

*Figure 8*

RUNNING COMPLEX WORKFLOWS IN DISTRIBUTED SYSTEMS WHILE PROTECTING CONSISTENCY AND ENSURING PROGRESS DESPITE FAILURES

BACKGROUND

Certificate management is one example of a complex workflow that is implemented in a distributed computing environment. Certificate management involves the periodic rotation of secrets and certificates between multiple distributed computing systems. These distributed computing systems include a client system seeking services, a service principal that provides the services and a key repository that maintains and generates the certificates that are used to control access to the services. For instance, by way of example, a client website can interface with a service principal for cloud services that are provided to the client website when the client website is authenticated in response to providing a valid certificate to the service principal.

One example of a service principal is Microsoft's Azure Active Directory (AAD), which is configured to provide various services including virtual machines and other cloud resources to an authenticated client. A corresponding example of a key repository is Microsoft's Azure Key Vault (AKV), which periodically creates, stores and provides new certificates that are used by the service principal and the client to authenticate the client's access to the AAD services.

During execution of a certificate management workflow, it is critical that the certificates are created, stored and used in the proper order by the various distributed systems. Otherwise, a client can get locked out of the services that are hosted by the service principal and critical data can be lost.

The order of execution can also be important for other complex workflows that are implemented in distributed computing environments. Accordingly, some complex workflows are designed to run as transactions with tight control over the order of operations. However, in such transactional workflows, a failure of a single workflow process will often cause the entire workflow to fail.

Other complex workflows are designed with live-site operations and/or one-off scripts that are configured to run independently from the rest of the workflow. This design, however, can expose the overall workflow to inconsistencies and disordered execution and, ultimately, to overall workflow failure.

Accordingly, there is an ongoing need for improved systems and techniques for designing and running workflows, particularly complex workflows in distributed computing environments. It will be appreciated, however, that the subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods and storage devices for running complex workflows that are composed of idempotent actions. The idempotent actions enable the workflow to progress towards successful completion, despite any independent failures of the idempotent actions.

In some embodiments, a workflow is accessed. This workflow is composed of a plurality of idempotent actions that are each executable as individual atomic units and which can be executed any number of times and with any number of failed attempts without causing the overall workflow to fail. Each idempotent action includes a corresponding action name, a corresponding guard that specifies one or more guard conditions for triggering execution of the idempotent action, idempotent code that is atomically executable in the workflow when the guard conditions are satisfied, and a record that reflects a state of execution.

For each idempotent action defined in the workflow, the computing system will determine whether the one or more guard conditions are satisfied for triggering execution of the corresponding idempotent code. This processing is performed iteratively at a predetermined interval, for each idempotent action, until the corresponding guard conditions are satisfied.

Thereafter, upon determining the one or more guard conditions are satisfied, the idempotent action takes a lock on one or more resources used for executing the idempotent code and the idempotent code is executed.

Upon successfully executing the idempotent code, the record is updated to reflect successful execution of the idempotent action and the lock is released. Alternatively, upon failing to successfully execute the idempotent code, an exception is logged, the lock is released, and the system continues to iteratively attempt to validate the guard conditions and to execute the idempotent action, until execution is successful.

The structured design of workflows composed of idempotent actions, as described herein, enables the workflows (after being initiated) to progress towards completed and/or successful execution, despite any independent failures of the idempotent actions during execution of the workflows. The guard conditions also permit initiated processing of the idempotent actions at any arbitrary timing, even concurrently or out of a workflow order, relative to other actions in the workflow, without disrupting overall execution of the workflow, inasmuch as the idempotent code for each idempotent action will only be executed when the corresponding guard conditions are satisfied.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates a flow diagram of acts associated with executing a workflow composed of a plurality of idempotent actions;

FIG. 8 illustrates a table of a plurality of idempotent actions associated with a certificate management workflow that is executable in the distributed computing environment referenced in FIG. 7.

DETAILED DESCRIPTION

Figure 1:
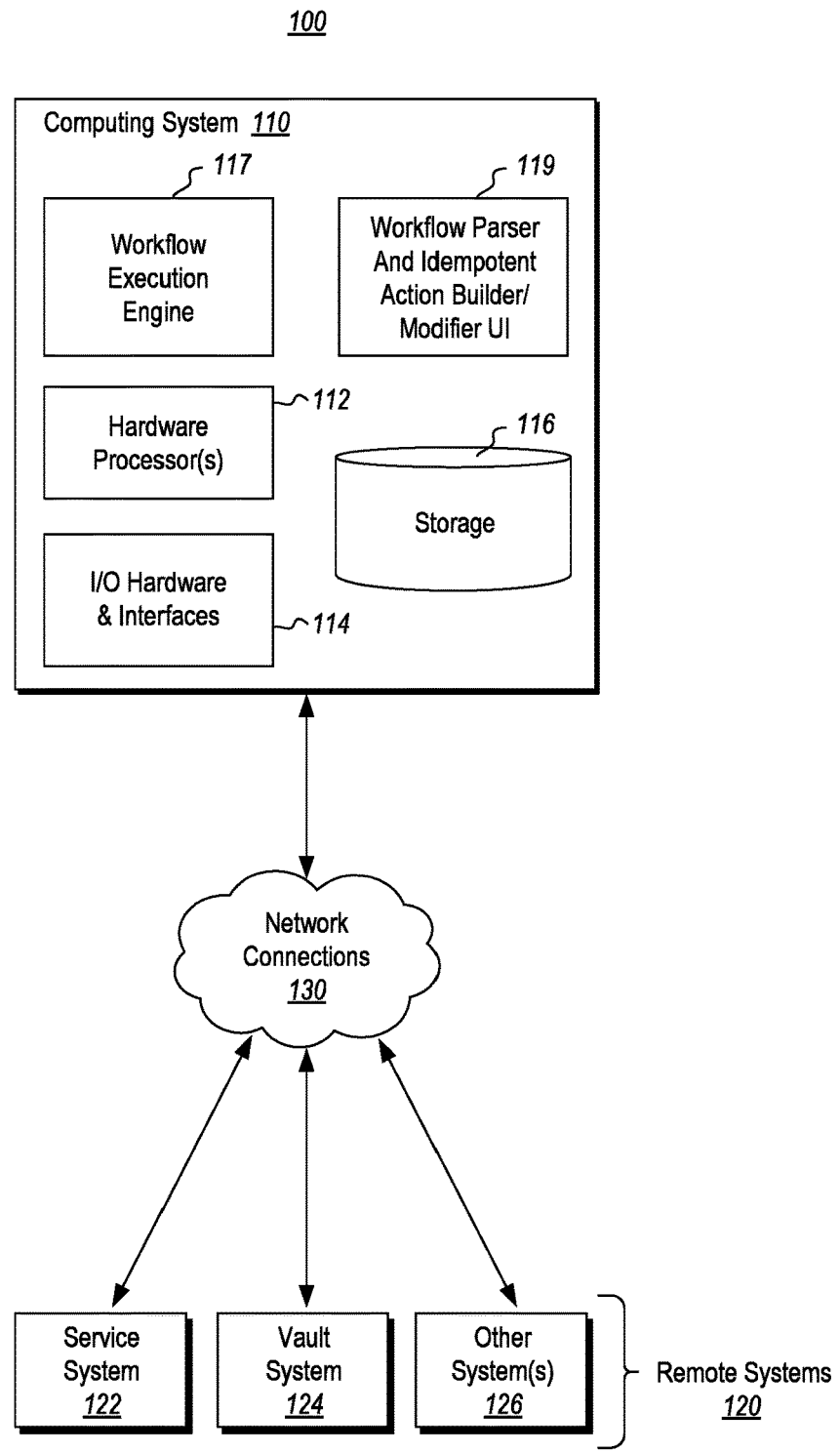
FIG. 1 illustrates a visualization of a distributed computing environment that may include and be used to implement aspects of the disclosed embodiments.

As described herein, various systems, methods and storage devices are provided for processing complex workflows composed of idempotent actions. The idempotent actions enable their corresponding workflows to execute progressively towards successful completion, despite any independent failures of the idempotent actions during execution of the workflows.

It will be appreciated that workflows composed of idempotent actions represent a significant technical improvement over traditional workflows that are not composed of idempotent actions, particularly for complex workflows that are susceptible to data loss and execution failure when one or more processes from the traditional workflows fail and/or are executed out of order.

The technical advantages provided by the disclosed workflows composed of idempotent actions include the enabled functionality of workflows (after being initiated) to progress towards successful completion, despite any independent failures of the idempotent actions in the workflows during execution of the workflows. The technical advantages also include the enabled processing of the idempotent actions at any arbitrary timing, even concurrently or out of order, relative to other actions in the workflow, without disrupting overall execution and successful completion of the workflow. One advantage provided by using idempotent actions in the workflow is the enablement of processing different actions concurrently for increasing the overall efficiency and speed in completing the workflow. This efficiency is particularly notable when some of the idempotent actions are not critically dependent upon other actions being completed first.

In some disclosed embodiments, a workflow is accessed, which is composed of a plurality of idempotent actions that are each executable as individual atomic units. Each idempotent action includes a corresponding action name component used to identify and call the action, a corresponding guard component that specifies one or more guard conditions for triggering execution of the action, an execution component having idempotent code that is atomically executable in the workflow when the guard conditions are satisfied, and a record component that reflects a state of execution for the action.

For each idempotent action defined in the workflow, the computing system will determine whether the one or more guard conditions are satisfied for triggering execution of the corresponding idempotent code. This is performed iteratively, for each idempotent action, until the corresponding guard conditions are satisfied.

Thereafter, upon determining the one or more guard conditions are satisfied for an idempotent action, the idempotent action takes a lock on one or more resources used for executing the idempotent code. The idempotent code is then executed.

Upon successfully executing the idempotent code for the idempotent action, the record is updated to reflect execution of the idempotent action and the lock is released. Alternatively, upon failing to successfully execute the idempotent code, an exception is logged, the lock is released, and the system continues to iteratively attempt to validate guard conditions and to execute the idempotent action, until execution is successful.

Attention will now be directed to FIG. 1, which represents a distributed computing environment 100 that includes and/or that may be used to implement aspects of the disclosed invention. As shown, the distributed computing environment 100 includes a computing system 110 that is in communication with one or more remote systems (i.e., service system 122, vault system 124 and/or other system(s) 126) through network connections 130. The network connections include any combination of wired and wireless connections.

While the computing system 110 is shown to be connected to three different remote systems 120, it will be appreciated that the scope of the disclosed and claimed embodiments include the incorporation and/or use of a computing system that is in communication with none or any quantity of the disclosed remote systems 120.

Examples of the service system 122 and the vault system 124 will be described in more detail, below, with reference to the certificate management embodiments provided with respect to FIGS. 7-9. The other system(s) 126 may include any combination of standalone or distributed systems, client systems, server systems, virtual machines, distributed portions of the computing system 110, and so forth.

Figure 5:
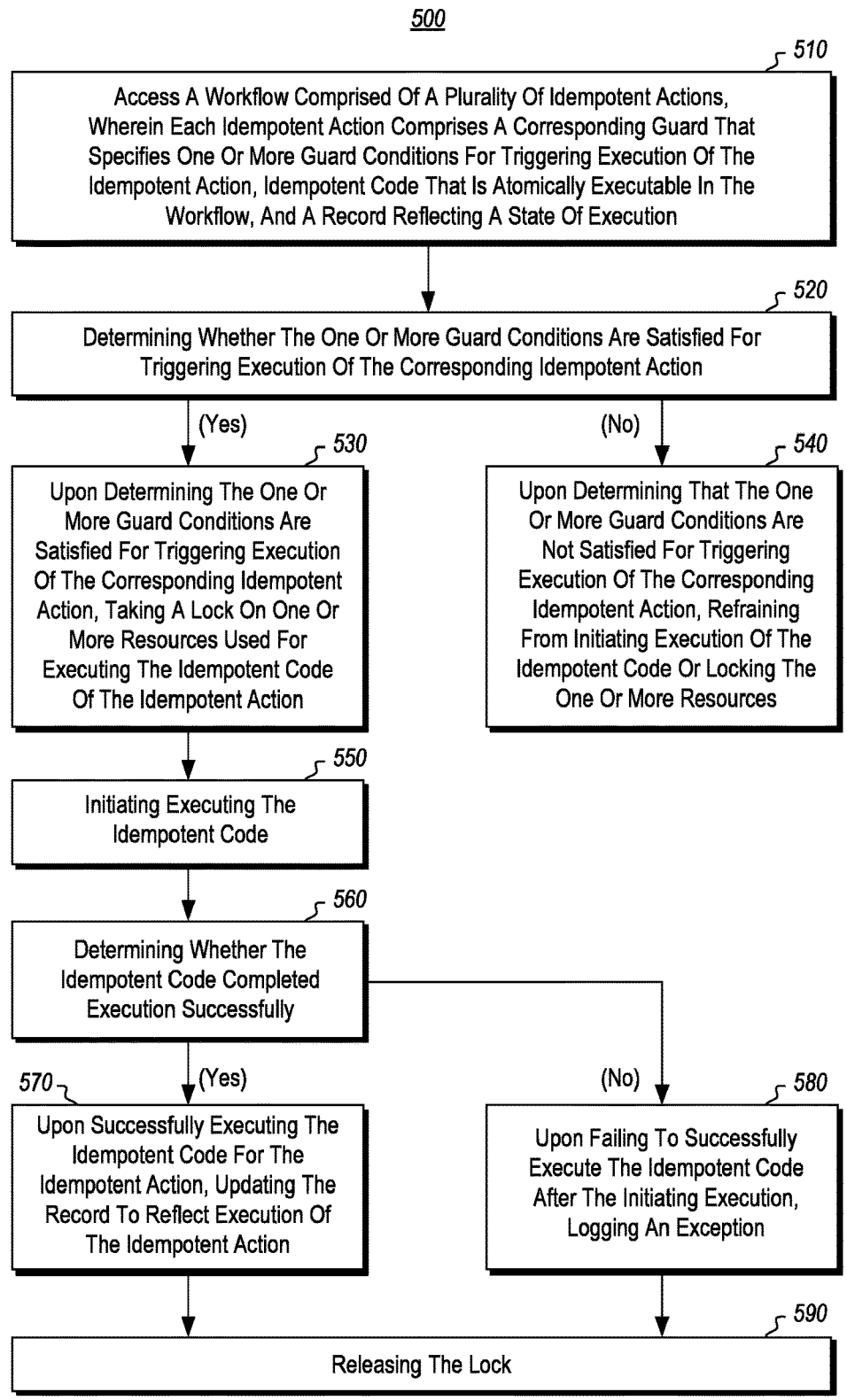
FIG. 5 illustrates another flow diagram of acts associated with executing a workflow composed of a plurality of idempotent actions.
Figure 6:
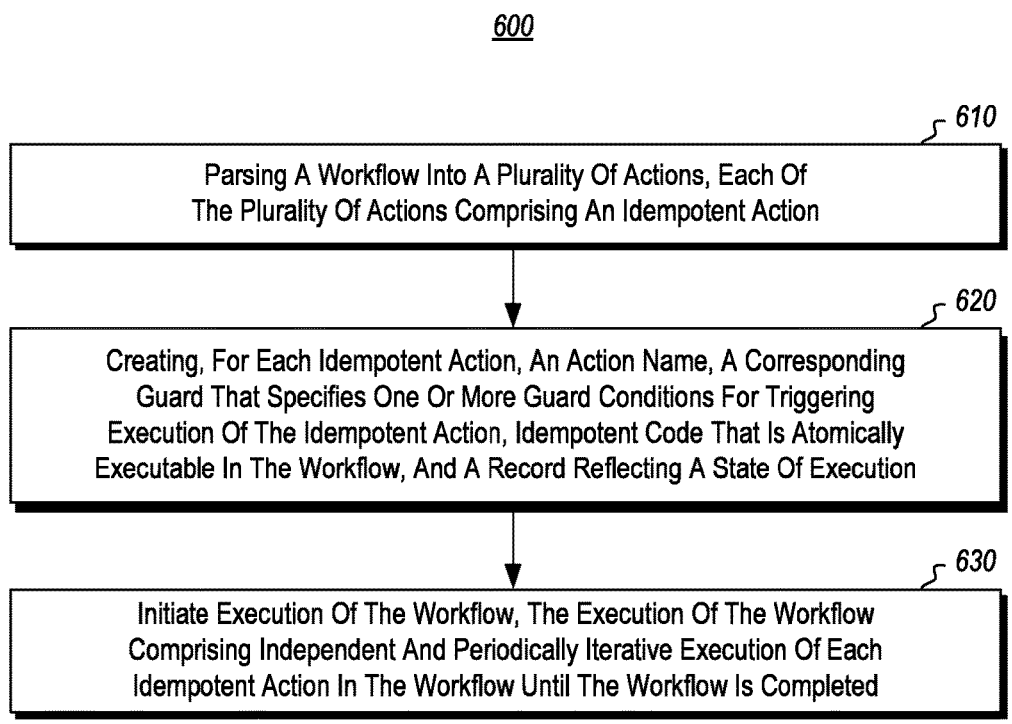
FIG. 6 illustrates a flow diagram of acts associated with generating and executing a workflow composed of a plurality of idempotent actions.

As shown, the computing system 110 is configured with one or more hardware processor(s) 112 that are configured to execute stored computer-executable instructions stored in the storage 116 of the computing system 110 to cause the computing system to implement the disclosed methods described herein (e.g., the methods referenced in FIGS. 4-6).

The computing system 110 also includes various input and output hardware and interfaces 114 that enable user interaction with the computing system to receive input and to render output associated with the methods described herein. The input and output hardware and interfaces 114 also enable communications between the computing system and the remote system(s) 120.

In some instances, the storage 116 (which may comprise any combination of volatile and non-volatile memory)

includes computer-executable instructions for instantiating the workflow execution engine 117 and the workflow parser and idempotent action builder/modifier UI 119.

The workflow execution engine 117 is configured with executable code for executing a workflow of idempotent actions and for processing the idempotent actions according to the disclosed embodiments. The processing performed by the workflow execution engine 117 includes processes for identifying idempotent actions in a workflow, iteratively checking to see whether guard conditions in the idempotent actions are satisfied, executing idempotent code defined by the idempotent actions, taking and releasing locks on resources involved in the execution of the idempotent code, taking and releasing locks on a journal or other records that reflect the execution states for the idempotent actions, and recording or otherwise updating execution states for the idempotent actions.

The workflow parser and idempotent action builder/modifier UI 119 includes executable code for identifying a workflow and parsing the workflow into discrete processes that are idempotent. The workflow parser and idempotent action builder/modifier UI 119 also builds, reformats and/or translates the structured code for each of the processes idempotent code modules. The workflow parser and idempotent action builder/modifier UI 119 also creates or modifies idempotent action data structures. Each idempotent action and corresponding idempotent action data structure includes an action name for calling and identifying the idempotent action, one or more guard conditions that identify conditions that must be satisfied before the idempotent action will be executed, idempotent code that is executable when the one or more guard conditions are satisfied, and a record component that reflects an execution state of the idempotent action. The idempotent action data structures are stored individually and/or as part of a workflow data structure in the storage 116 and/or other system(s) 126.

In some instances, the workflow parser and idempotent action builder/modifier UI 119 uses templates and/or artificial intelligence to automatically parse a workflow and generate the corresponding idempotent actions for the workflow. In other instances, a human designer parses the workflow into discrete actions and/or provides input for generating one or more of the name, guard conditions, idempotent code and record components of the idempotent action(s) with one or more of the input/output hardware and interfaces 114.

In yet other instances, the workflow parser and idempotent action builder/modifier UI 119 includes interface options for enabling a human designer to selectively assemble the workflow from previously created action modules that are stored in the storage 116 of the computing system and/or the other remote system(s) 126.

Figure 2:
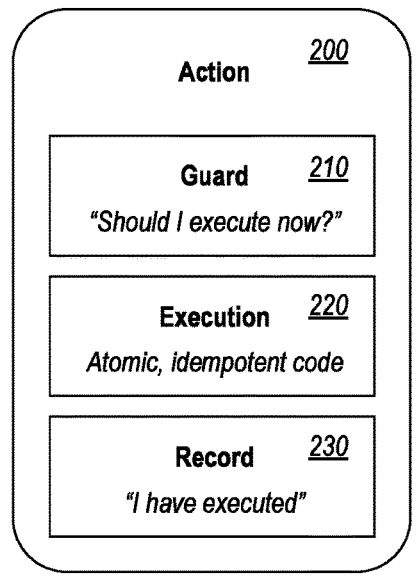
FIG. 2 illustrates an architecture visualization of an idempotent action that includes a guard component, an execution component and a record component.

Attention is now directed to FIG. 2, which visually represents some of the components of an idempotent action and corresponding data structure. As shown, the idempotent action includes a name component, currently reflecting a name of 'action' 200, and which may be synonymous with or at least reflective of the functionality of the idempotent action.

The idempotent action also includes a guard component 210 that controls when/whether the idempotent action should be executed and, even more particularly, whether the idempotent code in the execution component 220 should be executed. In some instances, the guard component 210 includes one or more conditions that specify timing for initiating execution of the idempotent code. The timing can be a relative and predetermined interval or passage of time or CPU cycles, such as time or cycles since a last attempted or successful execution (e.g., seconds, minutes, days, weeks, n-CPU cycles, etc.). The timing can also be an absolute time, such as a particular calendar date/time (e.g., hour, day, week, month and/or year). In some instances, the timing for one idempotent action in a workflow differs from the timing specified for another idempotent action in the same workflow.

The guard conditions can also specify one or more environmental or circumstantial conditions that must be validated or otherwise satisfied prior to triggering execution of the corresponding idempotent code. Environmental conditions can include, for example, a particular state of a computing system or application (e.g., active, inactive, sleep mode, upon successful execution of another action, upon detecting certain input, and so forth).

Execution component 220 includes idempotent code that can be written in any computer-readable programming language. Idempotent code is understood by those of skill in the art to include any function that is repeatable any multiple times without changing the result of the function beyond an initial application. For instance, a function (f(x)) is idempotent when $f(x)=f(f(x))=f(f(f(x)))$ .... By way of example, suppose there is a workflow for (a) identifying a particular value in a database field (e.g., originally set at 4), (b) changing the value to a predetermined value (e.g., changing to 5), and (c) reading the resulting value to validate the new value setting. Each process (a, b & c) in this workflow can be defined by an idempotent action, since the steps for reading a value will have the same effect and changing the value to 5 will always have the same effect no matter how many times they are executed (each function is, $f(x)=f(f(x)$ ...). It is noted, however, that the overall sequence or workflow is not idempotent, inasmuch as the first output/reading will result in a value of 4 and every subsequent reading/output will result in a 5. In this manner, it is possible to parse an un-idempotent workflow into a plurality of discrete idempotent actions.

The idempotent action is idempotent because of the idempotent code. The idempotent code is only executable, however, in response to the guard conditions being satisfied. This enables the processing of the idempotent action to occur at any time, even out of a desired workflow order, since the idempotent code will only execute when the guard conditions enable execution.

The record component 230 comprises meta-data that reflects a current execution state of the action and even more particularly the execution state of the idempotent code. The current execution state includes, in some embodiments, a time of last execution. When execution of the idempotent code is successful, the current execution state also includes, in some instances, an indicator of successful execution (e.g., a binary indicator or flag that indicates successful execution and/or a value or string that comprises the output from the successful execution, or a pointer to the output or a remote journal entry of the execution state).

When the current execution state corresponds to a failed execution, the execution state includes, in some instances, an indicator of failed execution (e.g., a binary indicator or flag that indicates failed execution, and/or the current value or string that is modifiable by or associated with the action, and/or a pointer to the execution state). The current execution state for failed execution of an action also includes, in some instances, an exemption log, a time of a last attempted execution and/or a pointer to the exemption log/time of a last attempted or successful execution.

In some alternative instances, the record component 230 includes executable code for creating or modifying the execution state that is recorded with the idempotent action or, in some instances, that is stored separately from the data structure of the action. The execution state is stored, alternatively, in some instances, in a journal that comprises a structured database (e.g., SQL database) or, in other instances, as an unstructured flat file. When the journal is stored separately from the action data structure, the journal can be stored by a same computing system that stores the action data structure and/or in storage location of a remotely located computing system. The journal is a useful structure for enabling auditing of a workflow. By examining the journal, it is possible to see the state of completion of the workflow and the individual actions in the workflow. It is also possible to see the success and/or failures of any particular actions in the workflow. The journal can be accessed and read during execution of the workflow and/or at another time, such as when the workflow is not being processed.

Figure 3:
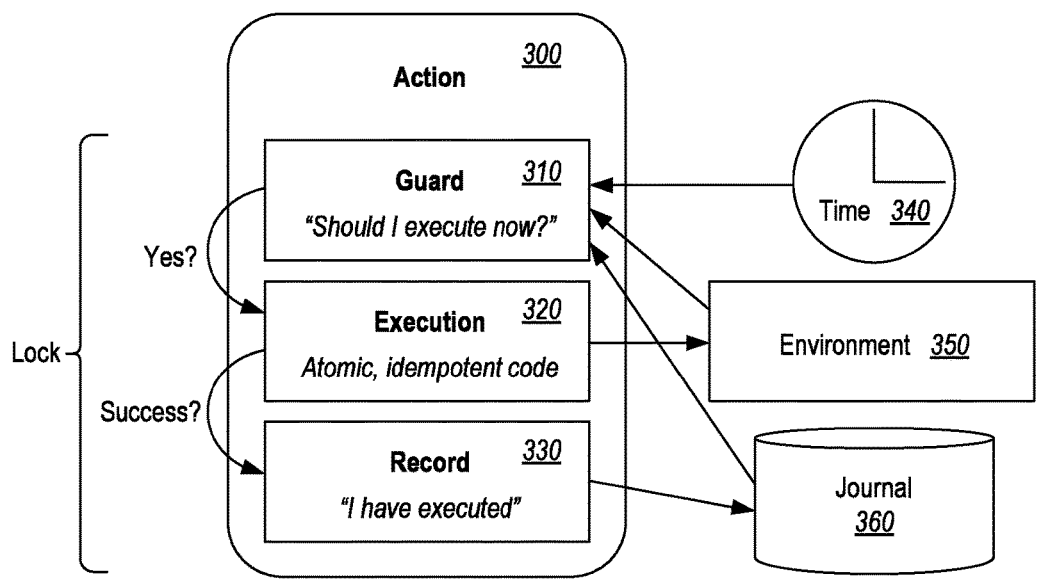
FIG. 3 illustrates an architecture visualization of relationships between components of an idempotent action with time, environmental conditions and a journal.

FIG. 3 illustrates another example of an idempotent action with corresponding name (300), guard (310), execution (320) and record (330) components. As suggested by this illustration, the action is configured to take a lock upon determining that a condition of the guard component (310) is satisfied, such as a recorded failed execution state of an action, a passage of time since last execution, certain environmental conditions (350), and so forth, as described above.

Upon detecting satisfied guard conditions, the action takes a lock on the corresponding resource(s) associated with execution of the action, which may include the components being operated on, as well as the journal (360) or other record mechanism(s), so that no other action can modify resource(s) and/or the execution state(s) during execution of the idempotent code that is specified by the execution component (320).

During execution, the action may affect or interact with the environment 350, including stored data elements. After execution, the record component (330) creates/updates the execution state of the action in the record portion of the action data structure and/or a remote journal (360), as described above. After successful execution or failed execution, the action releases the lock that was previously taken. In some instances, the lock is only a lock on resources being used for execution of the action, excluding the journal. In other instances, the lock (alternatively or inclusively) includes a write lock on resources that include the record/journal. In some instances, the lock can also comprise a read lock on the record/journal and other resources.

Attention is now directed to FIG. 4, which illustrates a flow diagram 400 of acts associated with running a workflow composed of idempotent actions. As shown, the flow diagram includes an act of identifying a workflow comprised of a plurality of idempotent actions (act 410). In some instances, the workflow consists of only idempotent actions (i.e., is composed entirely of idempotent actions, omitting or excluding any actions that are not idempotent actions). Each idempotent action comprises, in some instances, (a) an action name, (b) a corresponding guard that specifies one or more guard conditions for triggering execution of the idempotent action, (c) idempotent code that is atomically executable in the workflow, and (d) a record reflecting a state of execution of the corresponding action.

After the workflow is identified, the workflow is executed (act 420), commencing with the initiation of the workflow and concluding when all of the idempotent actions have been successfully executed. Accordingly, the workflow execution will include, in some instances, the independent and periodic and iterative initiation of each idempotent action until all of the idempotent actions in the workflow have successfully initiated and executed. It will be appreciated, however, that the iterative initiation of an idempotent action does not necessarily mean successful completed execution and may only include partial execution (e.g., determining whether the guard conditions are satisfied). It will also be appreciated that the periodic iterative initiation may include executing the various idempotent actions at any specified period/interval (fixed or variable), until execution of the corresponding idempotent action has been successfully completed.

FIG. 5 illustrates a more detailed flow diagram 500 of acts associated with methods for running workflows composed of idempotent actions. First, a workflow comprised of a plurality of idempotent actions is accessed (act 510). This access may include obtaining an established workflow, modifying a workflow and/or creating a workflow. As indicated before, the idempotent actions of the workflow comprise corresponding guards that specify guard conditions for triggering execution of the idempotent actions, idempotent code that is atomically executable in the workflow, and a record reflecting a state of execution.

Next, a determination is made whether the one or more guard conditions are satisfied for triggering execution of the corresponding idempotent action (act 520). Upon determining that the one or more guard conditions are not satisfied for triggering execution of the corresponding idempotent action, the executing system/action refrains from initiating execution of the idempotent code in the action or from locking the one or more resources associated with implementation of the idempotent code (act 540). Alternatively, upon determining that the one or more guard conditions are satisfied for triggering execution of the corresponding idempotent action, the executing system/action takes a lock on the resource(s) associated with execution of the idempotent code (act 530) and then execution of the idempotent code is initiated (act 530).

After initiating execution of the idempotent code (act 530), a determination is made as to whether the idempotent code has successfully executed (act 560). Upon successfully executing the idempotent code, the record is updated to reflect the execution of the idempotent action (act 570). This may include creating or updating of the execution state in the record and/or journal with the corresponding execution time and execution state. The lock is then released (act 590).

The lock is also released (act 590) when a determination is made that the idempotent code failed to complete successful execution. When the idempotent code fails to execute completely, an exception is logged in the record or journal, or another log.

Although not explicitly shown, the acts shown in the flow diagram 500 may be implemented in an iterative fashion until execution of the entire workflow is successfully completed. This may include performing some or all of the illustrated acts in one or more iterative cycles. This may include partially and/or completely processing various combinations of one or more of the idempotent actions in the workflow any quantity of times during execution of the workflow. This may even include re-initializing processing of a particular action, even while that same action is already being processed. For instance, a particular action may be executing the idempotent code (act 550) while concurrently determining whether the one or more guard conditions are satisfied (act 520) for re-executing the same idempotent code (act 550). Likewise, upon detecting unsatisfied guard conditions (act 540) or upon failing to complete successful execution of the idempotent code (act 580), the processing of the workflow may include re-evaluating whether the one or more guard conditions are satisfied (act 520) for initiating or re-initiating execution of the corresponding idempotent code. In this manner, all of the idempotent actions in the workflow will continue to be processed towards successful execution until they are ultimately executed and/or the entirety of the workflow is completed.

FIG. 6 illustrates a flowchart 600 of a related method for generating and implementing a workflow composed of a plurality of idempotent actions. As shown, an identified workflow is first parsed into a plurality of actions that each comprise an idempotent action. The next act includes creating (act 620), for each idempotent action, a name, a corresponding guard that specifies one or more guard conditions for triggering execution of the idempotent action, idempotent code that is atomically executable in the workflow and a record that reflects a state of execution. Each of these components has already been described. Once created, each action data structure can be stored in a storage device of a computing system as part of a linked workflow or as a standalone idempotent action module for use with one or more different workflows.

Thereafter, execution of the workflow having the various idempotent actions is initiated (act 630). This execution can include the acts described in reference to FIGS. 4 and 5.

As previously mentioned, the workflows composed of idempotent actions represent technical improvements over traditional workflows, particularly complex workflows that are implemented in distributed computer networks. In particular, the disclosed workflows composed of only idempotent actions are enabled to be executed while continually progressing towards execution completion, despite any failures of the individual idempotent actions, and irrespective of the initiated processing time of the different idempotent actions, and without creating inconsistencies in the processed data that would normally occur with traditional workflows that fail transactionally when their individual non-idempotent processes are executed out of order or fail to complete execution in a predetermined period of time.

Figure 7:
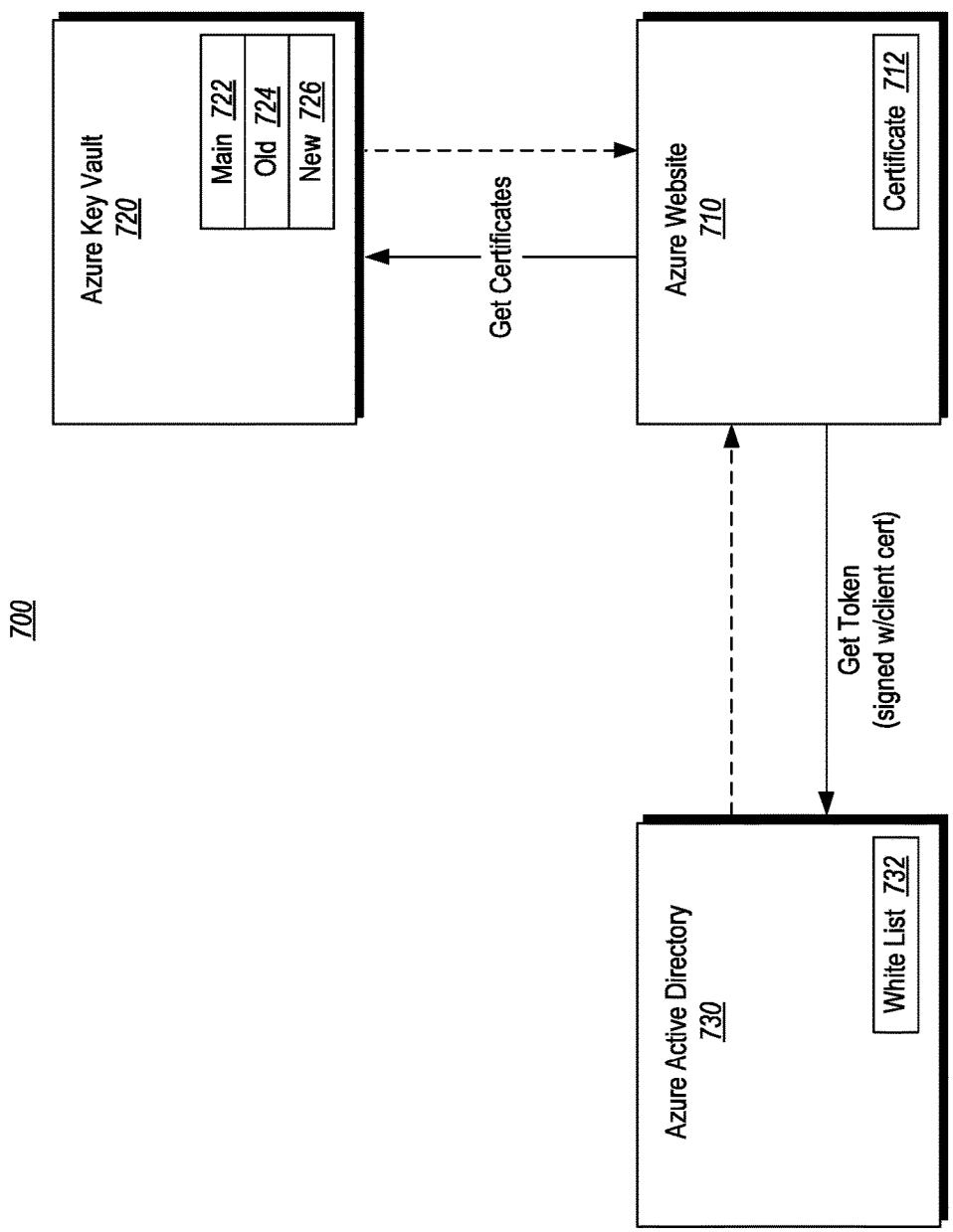
FIG. 7 illustrates a flow diagram of a distributed computing environment associated with a certificate management workflow.
Figure 9:
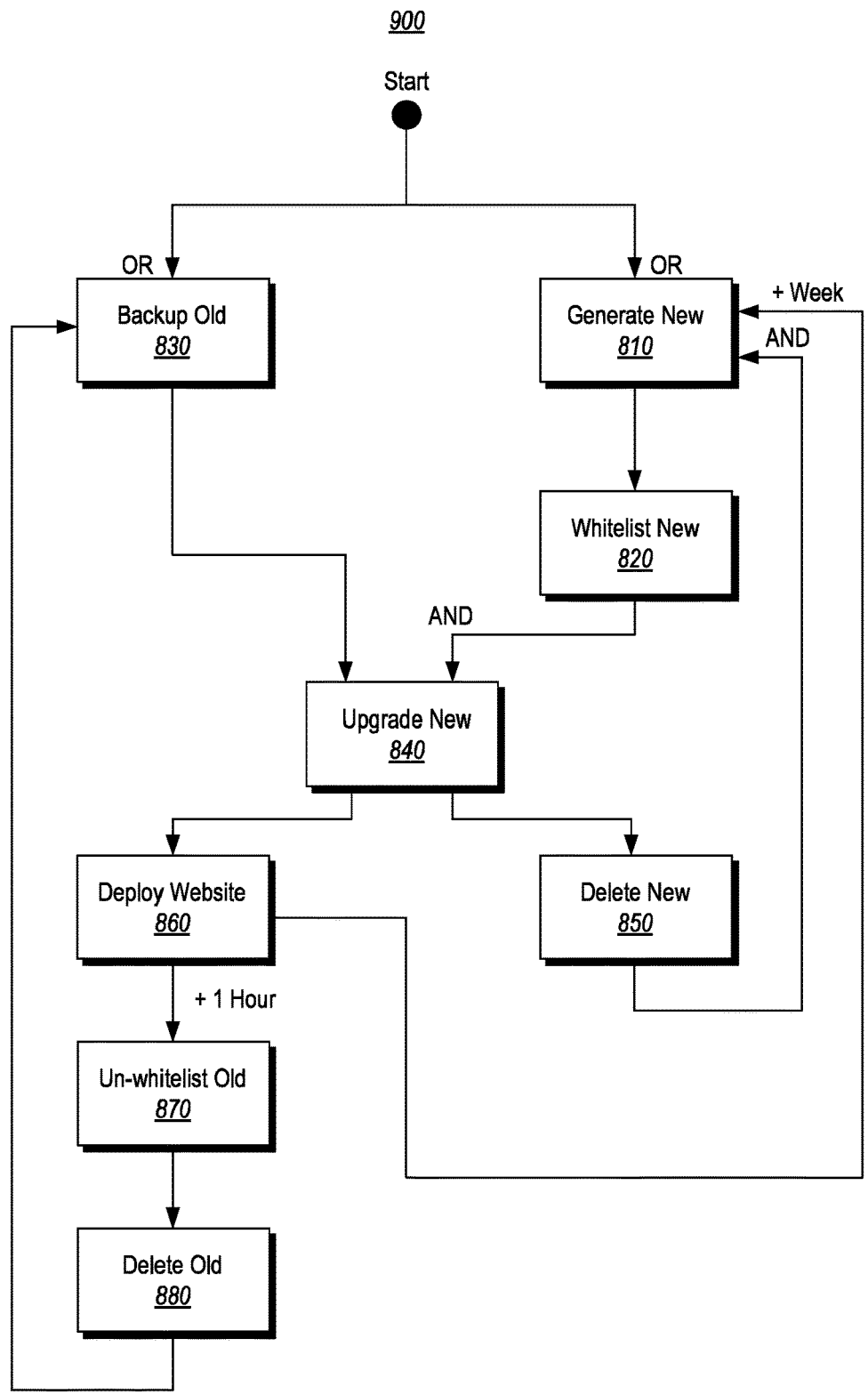
FIG. 9 illustrates a flow diagram of a certificate management workflow that is executable in the distributed computing environment shown in FIG. 7 and that includes the plurality of idempotent actions shown in FIG. 8.

Attention will now be directed to FIGS. 7-9 to illustrate a specific example of processing a complex workflow in a distributed computing environment. Even more particularly, FIG. 7 illustrates a distributed computing environment for implementing certificate management. FIG. 8 illustrates a table referencing idempotent actions associated with a workflow for implementing the certificate management. And, FIG. 9 illustrates a flow diagram associated with the certificate management workflow associated with the distributed computing network of FIG. 7 and that includes the idempotent actions referenced in FIG. 8.

As previously mentioned, certificate management is one example of a complex workflow that is implemented in a distributed computing environment, such as environment 700, which involves the periodic rotation of secrets and certificates between multiple distributed computing systems, such as a client system seeking services (e.g., Azure website 710), a service principal that provides the services (e.g., Azure Active Directory 730, referenced as AAD 730) and a key repository that maintains and generates the certificates that are used to control access to the services (e.g., Azure Key Vault 720, referenced as AKV 720).

For instance, Azure website 710 can interface with the AAD 730 for cloud services during a session in response to providing an authenticating certificate (e.g., certificate 712) to the AAD 730. The certificate 712 that was provided by the website 710 corresponds to a main certificate 722 stored at the AKV 720 or that is otherwise accessible to the AKV 720, and that is also stored on a whitelist 732 at the AAD 730 or that is otherwise accessible to the AAD 730. Once the certificate is provided by the website 710 to the AAD 730, the AAD 730 verifies it is on the whitelist and provides a corresponding session token to the website 710 that can be used to utilize the corresponding AAD services during the session.

In many instances, it is important to periodically rotate certificates (e.g., hourly, daily, weekly, monthly or at another period), to improve security to the AAD services by helping to prevent unauthorized spoofing and unauthorized use of certificates. The workflow for rotating certificates, however, can be somewhat complex and must be performed in a particular order or else the services/data secured by the certificates can be lost.

An example will now be provided to illustrate the flow of a certificate management workflow involving certificate rotation in the distributed environment 700 of FIG. 7. First, the AKV 720 generates a new certificate for the client website 710. The new certificate may be generated, for example, in response to receiving a suitable secret from the client website 710. Next, the new certificate is stored in a new certificate slot 726 at the AKV 720 for the client. The new certificate is also whitelisted at the AAD 730, such as by adding the new certificate to the AAD whitelist 732. Next, a copy of the old certificate, which was previously used (e.g., certificate 712) is written to the old certificate slot 724 at the AKV 720 and then the new certificate is written to the main slot 722 at the AKV 720. Thereafter, the certificate copy in the new slot 726 is deleted and the website is subsequently deployed using the new certificate corresponding to the new copy in the main slot 722. For instance, the website 710 can provide the new certificate (which overwrote certificate 712) to the AAD to receive a new token during a new session that is used to access the AAD services during the corresponding new session. To further improve security, the old certificate contained in the old slot 724 of the AKV is sent to the AAD 730 to be un-whitelisted (deleted) from the AAD whitelist 732. The copy of the old certificate in the old slot 724 is also deleted to prepare the AKV for the next certificate rotation.

To implement the foregoing workflow for rotating certificates, it is possible to write a single workflow that includes a plurality of non-idempotent functions. However, by doing this, the workflow would be vulnerable to many of the problems discussed earlier regarding executing actions out of order or exposing a workflow to transactional failure in response to a single function failing.

Accordingly to disclosed embodiments, many existing problems with complex workflows are overcome by parsing the workflows into idempotent actions and by structuring each of the idempotent actions with appropriate guard and execution components that enable the workflow to continue progressing towards execution completion, despite any independent failures of the idempotent actions and irrespective of the timing for initiating execution of the idempotent actions.

FIG. 8, for example, illustrates a table 800 with a plurality of idempotent actions that have been structured to implement a certificate management workflow of rotating certificate keys, such as in the environment 700 of FIG. 7, and as described in the flow diagram 900 of FIG. 9.

The idempotent actions for this workflow include an action named "generate new" (810) for generating a new certificate. The guard conditions for this action include verifying this is the first run of generating a certificate for the client, OR that the last certificate in the 'new' slot was deleted AND the last website deployment was at least one week ago (812). The idempotent code for this action (although not shown in code form) generates a new self-signed certificate on the key vault in the 'new' slot (814).

The next action is named "whitelist new" (820). Conditionally, upon a new certificate being generated (822), this action will send a request to the AAD to whitelist the certificate in the 'new' slot, signed with the certificate in the 'main' slot (824).

The "backup old" action (830) will conditionally copy the certificate in the 'main' slot to the 'old' slot in the AKV (834) upon determining it is the first run for generating a certificate OR the certificate in the 'old' slot was deleted (832).

The "upgrade new" action (840) will conditionally copy the certificate in the 'new' slot to the 'main slot in the AKV (844) upon determining the certificate in the 'main' slot was backed up AND the certificate in the new slot was whitelisted (842).

The "delete new" action (850) will conditionally delete the certificate in the 'new' slot (854) upon determining the certificate in the 'new' slot was just upgraded (852).

The "deploy website" action (860) will conditionally deploy the Azure website including the certificate in the 'main' slot from the AKV (864) upon determining certificate in the 'new' slot was just upgraded (862).

The "un-whitelist old" action (870) will conditionally send a request to the AAD to un-whitelist the certificate in the 'old' slot, signed with the certificate in the 'main' slot (874) upon determining the website has been deployed with a new certificate AND it has been at least one hour since deployment of the website (872).

The "delete old" action (880) will conditionally delete the certificate in the 'old slot in the AKV (884) upon determining the certificate in the 'old slot was just un-whitelisted (882).

Each of the foregoing actions (810, 820, 830, 840, 850, 860, 870 and 880) are idempotent actions, that can be initialized in any arbitrary order and at any frequency without causing inconsistencies in the workflow data (e.g., certificates) and without disrupting continued progress towards completed and/or successful execution of the workflow. This variable processing and the relationships between sequential processing of the idempotent actions (as controlled by the individual guard conditions), and is reflected in the flow diagram 900 of FIG. 9, enables the workflow to continue progressing, despite any failure of any individual idempotent action and irrespective of the timing for initiating processing of any of the idempotent actions referenced in FIG. 8.

With specific regard to the idempotent actions illustrated in FIG. 8, it will be noted that some of the guard conditions for the different actions are the same and some are different. Likewise, it will also be appreciated that the iterative period or predetermined intervals for initiating the processing of the different actions can be the same or different. In some instances, for example, the predetermined interval for initiating one or more actions in the workflow may be as short as a few seconds, a single second or less than a second, while the predetermined interval for initiating the one or more same or different actions in the workflow may also be as long as a minute, several minutes, several hours, several days or even longer. The predetermined interval for initiating processing of each action can be a global period or a variable period that is specified by the workflow, by the guard conditions and/or by a timing library that is used to control execution of the workflow and that is stored within the storage of the computing system.

Once an idempotent action in the workflow completes execution, it will then record/reflect the execution state of the action in the journal or other record associated with the action. This execution state is accessible to each of the other actions in the workflow and may be used to help determine whether one or more other guard conditions are satisfied for one or more other actions in the workflow.

It will be appreciated that the foregoing methods may be practiced by a computer system (such as described in FIG. 1) having stored computer-executable instructions that, when executed by one or more processors of the computing system, cause various functions to be performed by the computing system, such as the acts recited in the disclosed methods.

Embodiments of the present invention may comprise or utilize a special purpose or general-purpose computer including computer hardware, as discussed in greater detail below, as well as physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A network, which may include the network connections 130 is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more storage devices having stored computer-executable instructions which are executable by the one or more processors for causing the computing system to implement a method for executing a workflow, the method comprising:
accessing the workflow, the workflow comprised of a plurality of idempotent actions, wherein each idempotent action comprises a corresponding action name, a corresponding guard that specifies one or more guard conditions for triggering execution of the idempotent action, idempotent code that is atomically executable in the workflow, and a record reflecting a state of execution; and
for each idempotent action defined in the workflow, iteratively,
determining whether or not the one or more guard conditions are satisfied for triggering execution of the corresponding idempotent code,
based at least on determining the one or more guard conditions are satisfied for triggering execution of the corresponding idempotent code,
taking a lock on one or more resources used for executing the idempotent code of the idempotent action and initiating executing the idempotent code,
upon successfully executing the idempotent code for the idempotent action, updating the record to reflect execution of the idempotent action; and
releasing the lock; or
based at least on determining that the one or more guard conditions are not satisfied for triggering execution of the corresponding idempotent action,
refraining from initiating execution of the idempotent code;
updating the record to log an exception; and
repeating the determining whether the one or more guard conditions are satisfied again at a predetermined interval,
wherein the plurality of idempotent actions are executable without an ordering restriction, and at least one failure of at least one idempotent action is independent of an execution of another idempotent action.

2. The computing system of claim 1, whereupon executing the idempotent code of a particular idempotent action of the plurality of idempotent actions, the method further includes updating the record of the particular idempotent action to reflect the execution of the idempotent code.

3. The computing system of claim 2, wherein the record is stored as metadata with the idempotent action.

4. The computing system of claim 2, wherein the record includes a journal that is accessible to all idempotent actions in the workflow.

5. The computing system of claim 4, wherein the journal is stored as a structured database.

6. The computing system of claim 5, wherein the journal is stored as an unstructured flat file.

7. The computing system of claim 4, wherein the journal is stored independently of the idempotent action.

8. The computing system of claim 1, where taking the lock includes taking a write lock on the journal.

9. The computing system of claim 1, wherein the determining whether the one or more guard conditions are satisfied is performed iteratively, for each corresponding idempotent action at least until the corresponding idempotent action is executed.

10. The computing system of claim 9, wherein the predetermined interval for each idempotent action in the workflow is specified by an execution library for the workflow.

11. The computing system of claim 10, wherein the predetermined intervals for different corresponding idempotent actions in the workflow are different.

12. The computing system of claim 1, wherein the workflow, after initiating execution from a start, continues to progress towards completion, despite failures of idempotent actions in the workflow and without causing the workflow to reinitialize execution from the start by continuing to execute until each of the idempotent actions have executed according to the guard conditions associated with each idempotent action.

13. The computing system of claim 1, wherein the workflow comprises a certificate management workflow that is executed in a distributed computing environment and wherein the plurality of idempotent actions include at least:
an action for generating a new certificate;
an action for whitelisting the new certificate,
an action for upgrading to the new certificate to a main certificate; and
an action for deleting an old certificate.

14. A method implemented by a computing system for executing a workflow composed of a plurality of idempotent actions, the method comprising:
accessing the workflow composed of the plurality of idempotent actions, each idempotent action comprising a corresponding action name, a corresponding guard that specifies one or more guard conditions for triggering execution of the idempotent action, idempotent code that is atomically executable in the workflow, and a record reflecting a state of execution; and
for each idempotent action defined in the workflow, iteratively
attempting to execute the idempotent action at least until it is executed and by at least iteratively determining whether or not the one or more guard conditions are satisfied for triggering execution of the corresponding idempotent code and,
based at least on determining the one or more guard conditions are satisfied for triggering execution of the corresponding idempotent code,
taking a lock on one or more resources used for executing the idempotent code of the idempotent action and initiating executing the idempotent code;
upon successfully executing the idempotent code for the idempotent action, updating the record to reflect execution of the idempotent action; and
releasing the lock; or
based at least on determining that the one or more guard conditions are not satisfied for triggering execution of the corresponding idempotent action,
refraining from initiating execution of the idempotent code;
updating the record to log an exception; and
repeating the determining whether the one or more guard conditions are satisfied again at a predetermined interval,
wherein the plurality of idempotent actions are executable without an ordering restriction, and at least one failure of at least one idempotent action is independent of an execution of another idempotent action.

15. The method of claim 14, whereupon executing the idempotent code of a particular idempotent action of the plurality of idempotent actions, the method further includes updating the record of the particular idempotent action to reflect the execution of the idempotent code.

16. The method of claim 15, wherein the record is stored with the idempotent action and the record is accessible to all idempotent actions in the workflow.

17. The method of claim 14, where taking the lock includes taking a write lock on the record.

18. The method of claim 14, wherein the predetermined intervals for different idempotent actions in the workflow are different, at least some predetermined intervals being less than a minute and at least some predetermined intervals being greater than a minute.

19. The method of claim 14, wherein the workflow, after initiating execution from a start, continues to progress towards completion, despite any failures of idempotent actions in the workflow and without causing the workflow to reinitialize execution from the start by continuing to execute until each of the idempotent actions have executed according to the guard conditions associated with each idem potent action.

20. A computer program product comprising one or more storage devices having stored computer-executable instructions which are executable by the one or more processors of a computing system for implementing a method with the computing system for executing a workflow, the method comprising:
accessing the workflow, the workflow comprised of a plurality of idempotent actions, wherein each idempotent action comprises a corresponding action name, a corresponding guard that specifies one or more guard conditions for triggering execution of the idempotent action, idempotent code that is atomically executable in the workflow, and a record reflecting a state of execution; and
for each idempotent action defined in the workflow, iteratively, and at a predetermined interval,
determining whether or not the one or more guard conditions are satisfied for triggering processing of the corresponding idempotent action and,
based at least on determining the one or more guard conditions are satisfied for triggering processing of the corresponding idempotent action,
taking a lock on one or more resources used for executing the idempotent code of the idempotent action and initiating executing the idempotent code;
upon successfully executing the idempotent code for the idempotent action, updating the record to reflect execution of the idempotent action; and
releasing the lock; or
based at least on determining that the one or more guard conditions are not satisfied for triggering execution of the corresponding idempotent action,
refraining from initiating execution of the idempotent code;
updating the record to log an exception; and
repeating the determining whether the one or more guard conditions are satisfied again at a predetermined interval,
wherein the plurality of idempotent actions are executable without an ordering restriction, and at least one failure of at least one idempotent action is independent of an execution of another idempotent action.

* * * * *